(12) United States Patent
Elven

(10) Patent No.: US 8,204,928 B2
(45) Date of Patent: Jun. 19, 2012

(54) SYSTEM AND METHOD FOR ANALYZING INTERNET USAGE

(75) Inventor: Darrell Ray Elven, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 888 days.

(21) Appl. No.: 12/285,682

(22) Filed: Oct. 10, 2008

(65) Prior Publication Data

US 2010/0095215 A1    Apr. 15, 2010

(51) Int. Cl.
*G06F 15/16* (2006.01)

(52) U.S. Cl. ........ 709/200; 702/179; 380/270; 370/254; 726/25

(58) Field of Classification Search .................... 709/200
See application file for complete search history.

(56) References Cited

U.S. PATENT DOCUMENTS

| | | |
|---|---|---|
| 5,787,253 A | 7/1998 | McCreery et al. |
| 5,966,705 A | 10/1999 | Koneru et al. |
| 6,052,730 A | 4/2000 | Felciano et al. |
| 6,223,215 B1 | 4/2001 | Hunt et al. |
| 6,278,966 B1 | 8/2001 | Howard et al. |
| 6,366,298 B1 | 4/2002 | Haitsuka et al. |
| 6,397,256 B1 | 5/2002 | Chan et al. |
| 6,505,201 B1 | 1/2003 | Haitsuka et al. |
| 6,606,657 B1 | 8/2003 | Zilberstein et al. |
| 6,643,694 B1 | 11/2003 | Chernin |
| 7,343,412 B1 | 3/2008 | Zimowski |
| 7,376,730 B2 | 5/2008 | Pandya |
| 7,389,343 B2 | 6/2008 | Busch et al. |
| 2002/0069241 A1 | 6/2002 | Narlikar et al. |
| 2006/0171332 A1* | 8/2006 | Barnum ........................ 370/254 |
| 2007/0283441 A1* | 12/2007 | Cole et al. ........................ 726/25 |
| 2008/0137860 A1* | 6/2008 | Silvernail ..................... 380/270 |
| 2008/0140471 A1* | 6/2008 | Ramsey et al. ................... 705/7 |

OTHER PUBLICATIONS

Burgess, "Two dimensional time-series for anomaly detection and regulation in adaptive systems," 2002, Springer-Verlag Berlin Heidelberg, all pages.*

* cited by examiner

*Primary Examiner* — Hua Fan
(74) *Attorney, Agent, or Firm* — Finnegan, Henderson, Farabow, Garrett & Dunner LLP

(57) ABSTRACT

A computer-implemented method for detecting a repetitive activity pattern is disclosed. The method may include receiving activity data. The activity data may include timing information of a plurality of events. The method may also include determining a series of interval times associated with the plurality of events. The method may further include calculating a series of single standard deviations representing a running standard deviation of the series of interval times. The method may also include calculating a double standard deviation of the series of single standard deviations. The method may yet further include detecting a repetitive activity pattern if the double standard deviation is below a first pre-determined standard deviation threshold for a time period longer than a time threshold.

20 Claims, 2 Drawing Sheets

SYSTEM AND METHOD FOR ANALYZING INTERNET USAGE

TECHNICAL FIELD

This application relates to a system and method for analyzing Internet usage, and more particularly, to a system and method for analyzing internet usage to detect automated activities of websites.

BACKGROUND

The Internet is widely used for various purposes, such as communicating information, conducting business, and personal entertainment. Information regarding Internet usage may thus be valuable, as it indicates the frequency and duration that a particular website is used or a user's preference among various websites. In some cases, such as in a marketing study, Internet usage analysis may be performed to understand customers' online preferences. For example, the on-line user's activities may be monitored and used as a basis for targeting advertisements to the user. In some other cases, the human resource department of a corporation may utilize Internet usage analysis to monitor employees' Internet activities.

Among the several techniques used to analyze user activities on the Internet, proxy log analysis has been recently developed and widely used. For example, proxy log analysis may be used to determine how often an employee "surfs" the Internet during his work hours. Proxy logs may be created by various tools on a proxy server, such as a Microsoft Proxy Server 2.0 or a Microsoft ISA Server. Proxy logs record information about Internet events (known as "hits"), such as the URL of a hit, and the time the URL is downloaded. Based on such proxy logs, Internet usage time and usage frequency could be determined.

One system and method for monitoring individual Internet usage is described in U.S. Pat. No. 6,606,657 to Zilberstein ("the '657 patent"). The '657 patent is directed to gathering and disseminating detailed information regarding web site visitation. The system and method described in the '657 patent may obtain information regarding the sites that have been visited, the duration and times of such visits, the most popular sites, the most popular jump sites from a particular web page, etc. In particular, the '657 patent discloses a method for monitoring Internet usage by a user at a terminal, where the method includes the steps of, among other steps, detecting access by the user to a new website, determining a first time interval between the detected access to the new website and a detected access to a previous website, and determining a second time interval which indicates a period of time during which the user actively accessed the previous website. Information related to the access to both the new website and the previous website may be obtained from a proxy server.

Although the method described in the '657 patent may be effective for monitoring Internet usage via proxy log analysis, it may nevertheless be problematic. For example, many websites have automated activities, such as automated webpage refresh, updates, and pop-ups, and these automated activities may occur even when a user is away from the computer. When such automated activities occur, they are also recorded by the proxy logs. As a result, conventional sever log analysis, such as the one described in the '657 patent, may incorrectly include the automated web activities as active user interactions with the Internet. Furthermore, since automated activities may be misidentified as an access to a new website, or an active access to the previous website, the first and second time intervals determined based thereon may not be accurate. In addition, since the method described in the '657 patent monitors Internet usages on the server side, and thus may be incapable of analyzing Internet usage of a particular terminal user.

Therefore, there is a need to determine and indicate the existence of automated activities during a proxy log analysis. The disclosed system and method for analyzing Internet usage are directed towards overcoming one or more of the shortcomings set forth above.

SUMMARY

In one aspect, a computer-implemented method for detecting a repetitive activity pattern is disclosed. The method may include receiving activity data. The activity data may include timing information of a plurality of events. The method may also include determining a series of interval times associated with the plurality of events. The method may further include calculating a series of single standard deviations representing a running standard deviation of the series of interval times. The method may also include calculating a double standard deviation of the series of single standard deviations. The method may yet further include detecting a repetitive activity pattern if the double standard deviation is below a first pre-determined standard deviation threshold for a time period longer than a time threshold.

In another aspect, a computer-implemented method for analyzing Internet usage is disclosed. The method may include receiving proxy log data. The proxy log data may include timing information of a plurality of Internet events. The method may also include determining a series of interval times associated with the plurality of Internet events. The method may further include calculating a series of single standard deviations representing a running standard deviation of the series of interval times. The method may also include calculating a double standard deviation of the series of single standard deviations. The method may yet further include detecting an automated activity if the double standard deviation is below a first pre-determined standard deviation threshold for a time period longer than a time threshold.

In another aspect, an Internet usage analyzer is disclosed. The Internet usage analyzer may include a network interface configured to receive proxy log data from a proxy server. The proxy log data may include timing information of a plurality of Internet events. The Internet usage analyzer may further include a processor coupled to the network interface. The processor may be configured to determine a series of interval times associated with the plurality of Internet events. The processor may also be configured to calculate a series of single standard deviations representing a running standard deviation of the series of interval times. The processor may also be configured to calculate a double standard deviation of the series of single standard deviations. The processor may be further configured to detect an automated activity if the double standard deviation is below a first pre-determined standard deviation threshold for a time period longer than a time threshold.

DETAILED DESCRIPTION

Figure 1:
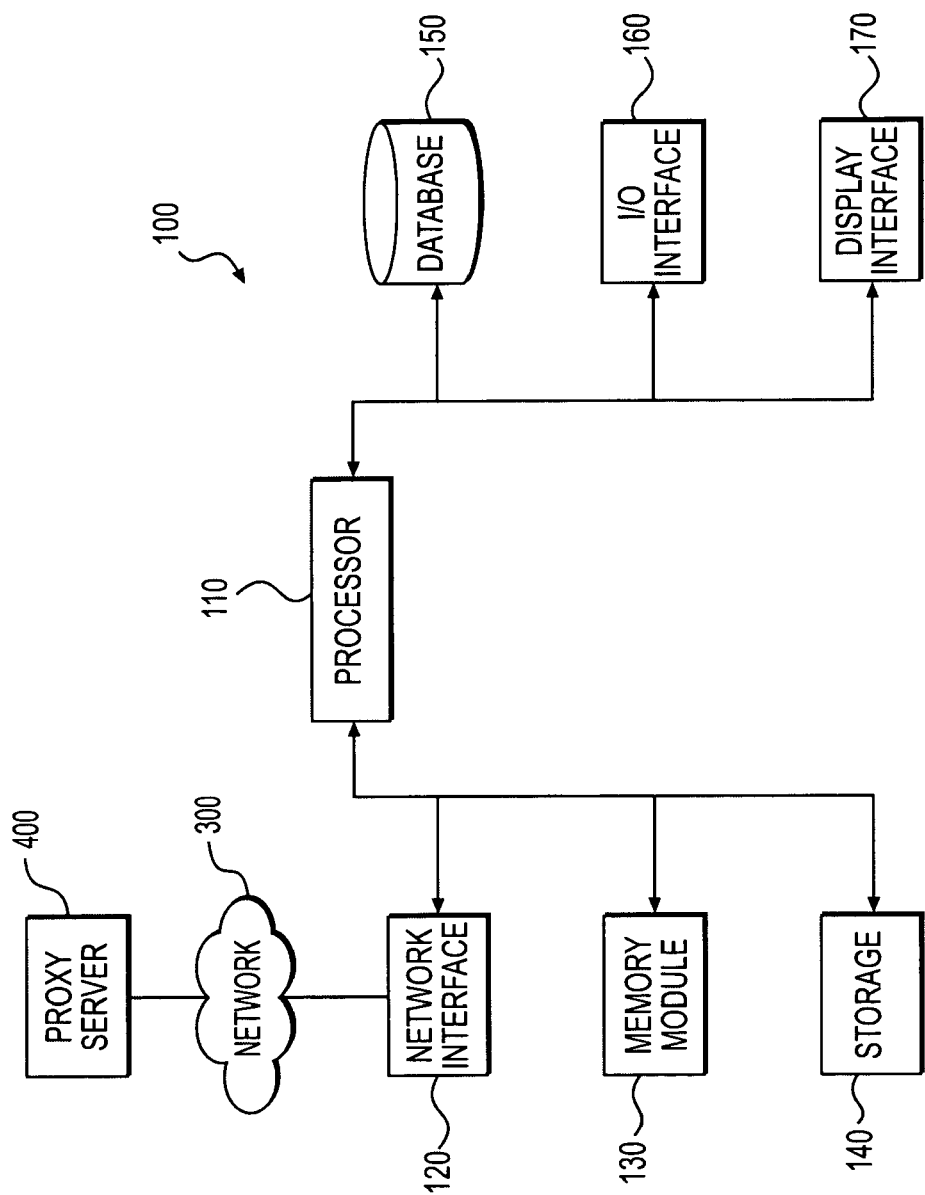
FIG. 1 provides a block diagram of an Internet usage analyzer, in accordance with an exemplary embodiment of the present disclosure.

FIG. 1 provides a block diagram of an Internet usage analyzer 100, in accordance with an exemplary embodiment of the present disclosure. As illustrated in FIG. 1, Internet usage analyzer 100 may include, among other things, a processor 110, a network interface 120, a memory module 130, a storage device 140, a database 150, an input and output (I/O) interface 160, and a display interface 170. It is contemplated that Internet usage analyzer 100 may include additional, fewer, and/or different components than those listed above. It is understood that the type and number of listed devices are exemplary only and not intended to be limiting.

Internet usage analyzer 100 may be configured to analyze the Internet usage of a user, such as to identify the usage pattern, frequency, and preference of the user. Internet usage analyzer 100 may also be configured to analyze the Internet usage of multiple users. Particularly, consistent with the present disclosure, Internet usage analyzer 100 may detect an automated activity associated with a website that the user has once accessed. For example, the user may actively access a webpage for a few minutes in the morning, and then leave his desk for an all-day-long meeting. While he is absent, the webpage may be automatically refreshed and/or updated. These automated activities, nevertheless, are also recorded in the proxy log data generated by a proxy server 400.

Automated activities may be detected by manually examining the proxy log data. Records that correspond to these automated activities may then be identified and removed from the log data. However, manually going through the proxy log data to identify automated activities may be very time consuming. Most automated websites refresh the content with a time-based pattern, while real user usages are relatively random. For example, a website may consistently refresh at an interval of every 10 seconds. Other websites have been shown to have a regularly repetitive pattern where they refresh at intervals of every 5, 15 or 30 seconds. The appearance of such an activity pattern, compared to the relatively random timing of user interactions with the Internet, may be an indication of automated website activities. Consistent with the present disclosure, Internet usage analyzer 100 may detect these automated activities, using this repetitive characteristic of the activities.

Network interface 120 may be configured to obtain proxy log data from a proxy server 400, via a network 300. It is contemplated that, in some embodiments, network interface 120 may be connected to more than one proxy servers via network 300. Proxy server 400 may be a server in a computer network, which services the requests of its clients, such as terminal computers, by forwarding requests to other servers. A terminal computer may connect to proxy server 400, requesting some service, such as a file, connection, web page, or other resource, available from a different server. Proxy server 400 may provide the resource by connecting to the specified server and requesting the service on behalf of the terminal computer. Consistent with the current disclosure, proxy server 400 can be placed in the user's local computer or at specific key points between the user and the destination servers or the Internet. Proxy server 400 may include thereon a computer system and/or an application program, such as a Microsoft Proxy Server 2.0 or a Microsoft ISA Server.

Proxy server 400 may generate a proxy log file that contains log information about a terminal computer's Internet activities. For example, each time a service is requested, the proxy log file may record the URL of a website that is accessed, and the time the URL is downloaded. Although only proxy server 400 is illustrated in FIG. 1, it is contemplated that network interface 120 may obtain proxy log data from multiple proxy servers, and combine the obtained data into one proxy log file for further analysis. For example, Internet usage analyzer 100 may be configured to connect with multiple proxy servers on multiple user terminals, and network interface 120 may receive proxy logs related to these user terminals.

Processor 110 may be a central processing unit ("CPU"). Processor 110 may also include any appropriate type of general purpose microprocessor, digital signal processor, or microcontroller. Processor 110 may execute sequences of computer program instructions to perform various processes that will be explained later. Processor 110 may be configured as a separate processor module dedicated to Internet usage analysis. Alternatively, processor 110 may be configured as a shared processor module for performing other functions unrelated to Internet usage analysis. Processor 110 may also include one or more printed circuit boards, and/or a microprocessor chip.

Memory module 130 may include one or more memory devices including, but not limited to, a ROM, a flash memory, a dynamic RAM, and a static RAM. The computer program instructions may be accessed and read from a ROM in memory module 130, or any other suitable memory location, and loaded into a RAM for execution by processor 110. Storage device 140 may include any appropriate type of mass storage provided to store any type of information that processor 110 may need to operate. For example, storage device 140 may include one or more hard disk devices, optical disk devices, or other storage devices to provide storage space.

Both memory module 130 and storage device 140 may be configured to store information used by processor 110. For example, memory module 130 and/or storage device 140 may be configured to store the proxy log file obtained by proxy server 400. Memory module 130 and/or storage device 140 may also be configured to store data generated by intermediate steps during the Internet usage analysis process and thresholds values entered by a user of Internet usage analyzer 100.

In one embodiment of the present disclosure, database 150 may store data used by Internet usage analyzer 100, such as the proxy log data associated with Internet activities. Database 150 may also include analysis and organization tools for analyzing and organizing the information contained therein.

I/O interface 160 may also be provided for a user to input information to Internet usage analyzer 100. I/O interface 160 may include a keyboard, a switch, a mouse, and/or a touch screen. I/O interface 160 may be coupled to processor 110 via data buses, communication cables, wireless networks, or other communication mediums. According to one embodiment, I/O interface 160 may include a graphic interface for user inputs. I/O interface 160 may be configured to receive input from a user, and send the information to processor 110 for processing or to memory module 130/storage device 140 for storage. For example, I/O interface 160 may be configured to receive thresholds associated with various parameters calculated during the Internet usage analysis. For example, the user may input a threshold of the standard deviation. In addition, I/O interface 160 may also be configured to receive a permission from the user to remove automated activities.

Display interface 170 may be, for example, a computer, an operator panel, or an LCD. According to one embodiment, display interface 170 may be an integral part of I/O interface 160. Display interface 170 may be coupled to processor 110 via communication cables, wireless networks, or other communication mediums. Display interface 170 may be configured to provide indication to the user when an automated activity is detected. For example, display interface 170 may display a text message to indicate the automated activity. Display interface 170 may also include an audio unit to provide an audible indication, or an optical unit to provide an optical indication, when the automated activity is detected. Alternatively, display interface 170 may display parameters calculated by processor 110 during the Internet usage analysis as waveforms in a chart.

Internet usage analyzer 100 may be operated by a human resource department and, as such, access to its contents may be limited to certain authorized personnel, such as, human resource managers. Furthermore, different personnel may have different levels of access depending on the type of information or content they are authorized to view. Access may be regulated using any suitable password application known in the art. Data transferred to and from Internet usage analyzer 100 may be protected using encryption software and other protection schemes, as would be apparent to one skilled in the art.

Internet usage analyzer 100 may include one or more software applications, including, for example, an automated activity detection tool. The automated activity detection tool may run on processor 110, and may be accessed by authorized users. Consistent with one embodiment, the automated activity detection tool may also be accessed by remote users via their respective computers and a network, such as, for example, network 300. It is also contemplated that the automated activity detection tool may be stored on a computer readable medium, such as a hard drive, computer disk, CD-ROM, or any other suitable medium, and may run on other types of systems similar to Internet usage analyzer 100, such as a personal computer.

Consistent with one embodiment of the present disclosure, the automated activity detection tool may further include one or more modules, and when executed by processor 110, may perform various functions related to detecting automated Internet activities. Processor 110 may be configured to execute the automated activity detection tool to determine a series of interval times between the plurality of Internet events recorded in the proxy log file. Next, processor 110 may execute the automated activity detection tool to calculate a series of single standard deviations. Consistent with one embodiment, a new single standard deviation may be calculated for every N interval times, where N is a constant number. For example, if processor 110 is configured with N=50, when a new Internet event is recorded and a new interval time is calculated, a new single standard deviation may be calculated for the last 50 interval times. That is, the single standard deviation is updated as each new interval time is calculated. The single standard deviation calculated may therefore be a running standard deviation.

Processor 110 may then execute the automated activity detection tool to determine if the calculated series of single stand deviations are below a first standard deviation threshold for a pre-determined amount of time. If such a situation occurs, processor 110 may communicate with display interface 170 to provide an indication of automated activities.

In the meantime, the automated activity detection tool may be further executed to calculate a double standard deviation. Consistent with one embodiment of the present disclosure, the double standard deviation may be a running standard deviation of the series of single standard deviations. Again, processor 110 may execute the automated activity detection tool to detect an automated activity if the double standard deviation is below a second standard deviation threshold for a pre-determined amount of time. If such a situation occurs, processor 110 may communicate with display interface 170 to indicate automated activities. Consistent with one embodiment, processor 110 may further operate to remove the detected automated activities, if authorized by the operator from any analysis of purposeful usage.

Figure 2:
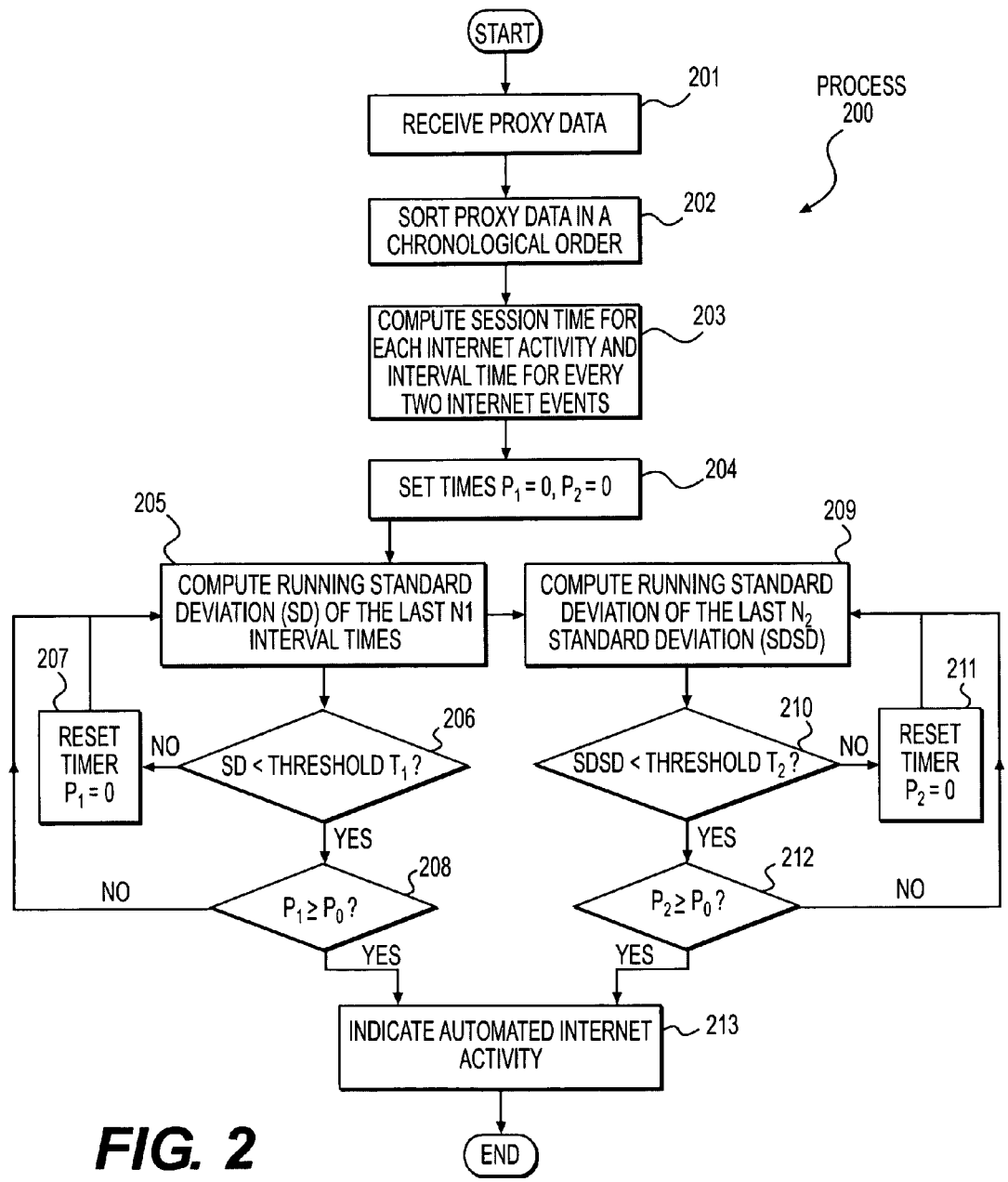
FIG. 2 provides a flowchart of an exemplary operation process of an Internet usage analyzer, consistent with the disclosed embodiment shown in FIG. 1.

FIG. 2 provides a flowchart of an exemplary operation process 200 of Internet usage analyzer 100, consistent with the disclosed embodiment shown in FIG. 1. Process 200 may start when a proxy log file is received from proxy server 400 (Step 201). The proxy log file may be received by network interface 120. Consistent with one embodiment, multiple proxy log files may be received from multiple proxy servers that are on a shared network with the user terminal and then combined to form a single log suitable for analysis. Network interface 120 may be also configured to receive updated proxy log files at a certain frequency, for example, every 30 seconds. Each proxy log file may include proxy data that are related to Internet activities.

After the proxy data are obtained, processor 110 may be configured to sort all the proxy data in a chronological order (Step 202). For example, when multiple proxy log files are received, proxy data in these files may be combined and sorted in a chronological order. If only one proxy log file is received, the proxy data therein may be already in a chronological order. In that case, step 202 may be skipped.

Processor 110 may be further configured to compute session times of the Internet activities (Step 203). For example, the session time may be computed as the time spent consistently interacting with various web sites. In Step 203, processor 110 may also be configured to compute interval times as the temporal distances between the proxy records of consecutive events. The calculated series of interval times may be temporarily stored in memory module 130 or database 150. Processor 110 may then create two timers, $P_1$ and $P_2$, and set them both to 0 (Step 204). Each of timers $P_1$ and $P_2$ may continuously record the relevant time duration of the event as long as the events last, and may stop when no more events are noted. Consistent with the present disclosure, timers $P_1$ and $P_2$ may be started in Step 204.

Processor 110 may be configured to compute a single standard deviation (SD) of the last $N_1$ interval times (Step 205). In probability and statistics, the standard deviation may be used as a measure of the dispersion of a collection of values. That is, a standard deviation may measure how widely spread the values in a data set are. For example, a series of data values may have a small standard deviation if all the data values are close to the mean value of the series. Various methods may be utilized to calculate the standard deviation. Consistent with one embodiment, the SD ($\sigma$) of N interval times $x_1, x_2, \ldots, x_N$ may be calculated according to formula (1) below:

$$\sigma = \sqrt{\frac{1}{N} \sum_{i=1}^{N} (x_i - \bar{x})^2}, \tag{1}$$

where $\bar{x}$ is the arithmetic mean of the interval times $x_i$, defined in formula (2) below:

$$\bar{x} = \frac{x_1 + x_2 + \ldots + x_N}{N} = \frac{1}{N} \sum_{i=1}^{N} x_i. \tag{2}$$

Processor 110 may compare the calculated SD with a first standard deviation threshold $T_1$ (Step 206). Consistent with one embodiment, $T_1$ may be a small number determined by the user and input from I/O interface 160. If the calculated SD is greater than $T_1$ (Step 206: No), processor 110 may reset timer $P_1$ to 0 (Step 207). That is, if a standard deviation exceeds the threshold $T_1$, it may be determined that no automated internet activity is detected, and thus, the detection process is reset and restarted. Once the timer $P_1$ is reset, process 200 may return to Step 205 and calculate the SD for the another $N_1$ interval times, once a new Internet event is recorded in a proxy log file on proxy server 400 and a new interval time is calculated by processor 110.

If the calculated SD is smaller than $T_1$ (Step 206: Yes), processor 110 may compare the value of the timer $P_1$ with a time threshold $P_0$ (Step 208). Consistent with one embodiment, $P_0$ may also be determined by the user and input from I/O interface 160. For example, in one embodiment, $P_0$ may be set as 6 minutes. If timer $P_1$ exceeds the time threshold $P_0$ (Step 208: yes), automated internet activity may be indicated (Step 213). That is, if the calculated running standard deviation keeps low (i.e., smaller than threshold $T_1$) for a certain time period, processor 110 may determine that there may be automated Internet activities recorded in the proxy log file. Processor 110 may then send a signal to display interface 170 for indicating the automated activity.

If timer $P_1$ is below the time threshold $P_0$ (Step 208: No), process 200 may return to Step 205 and calculate the next SD for the last $N_1$ interval times, once a new interval time between events is calculated by processor 110. Steps 205-208 may be repeatedly executed, until timer $P_1$ exceeds the time threshold $P_0$ (Step 208: Yes).

Automated activities that occur at a constant frequency may be reliably detected by Steps 205-208. For example, if a website may consistently refresh at an interval of every 10 seconds, the activity may be detected by monitoring the series of single standard deviations calculated in Step 205. However, when automated activities occur at multiple frequencies, single standard deviations alone may not be a reliable indication of these automated activities. For example, some websites may regularly refresh at intervals of every 5, 15 or 30 seconds. In order to detect automated activities with such patterns, processor 110 may be configured to execute Steps 209-212, in parallel to Steps 205-208.

Once a new single standard deviation is computed (Step 205), processor 110 may be configured to compute a double standard deviation (SD) of the last $N_2$ standard deviations (Step 209). That is, the double standard deviation may be a running standard deviation of the series of standard deviations. The double standard deviation may be a measure of the dispersion of the series of single standard deviations. Consistent with one embodiment, the SDSD may also be calculated according to formula (1) where $x_1, x_2, \ldots, x_N$ now becomes the standard deviations calculated in Step 205.

Processor 110 may compare the calculated SDSD with a second standard deviation threshold $T_2$ (Step 210). Similar to threshold $T_1$, $T_2$ may be a small number determined by the user and input from I/O interface 160. If the calculated SDSD is greater than $T_2$ (Step 210: No), processor 110 may reset timer $P_2$ to 0 (Step 211). That is, if the SDSD is sufficiently small (i.e., smaller than threshold $T_2$), it may be determined that no automated internet activity is detected. Accordingly, the detection process is reset and restarted, and process 200 may return to Step 209 to calculate the SDSD for another $N_2$ interval times, once a new SD is calculated by processor 110.

If the calculated SDSD is smaller than $T_2$ (Step 210: Yes), processor 110 may then determine if timer $P_2$ exceeds threshold $P_0$ (Step 212). If timer $P_2$ exceeds the time threshold $P_0$ (Step 212: yes), automated Internet activity may be indicated (Step 213). That is, if the calculated running SDSD is sufficiently low (i.e., smaller than threshold $T_2$) for a certain time period, processor 110 may determine that automated Internet activities may occur. Accordingly, processor 110 may instruct display interface 170 to indicate the automated activity. Consistent with embodiments of the present disclosure, indication of the automated activity may be in the form of a text message, display of an SD and/or SDSD curve with respect to time, audio message, or optical signal.

Consistent with one embodiment, once an automated Internet activity is detected and indicated to the user, the user may send a permission via I/O interface 160, to authorize processor 110 to remove or disregard the period of detected automated activity. For example, in determining an active Internet usage time, processor 110 may exclude the duration of the automated activity from the total Internet usage time. For another example, processor 110 may filter the proxy log data that correspond to the detected automated activities from the proxy log file.

Alternatively, if timer $P_2$ is below the time threshold $P_0$ (Step 212: No), process 200 may return to Step 206 and calculate the next SDSD for the last $N_2$ interval times, once a new SD is calculated by processor 110. Steps 209-212 may be repeatedly executed, until timer $P_2$ exceeds the time threshold $P_0$ (Step 212: Yes).

INDUSTRIAL APPLICABILITY

Although the disclosed embodiments are described in association with Internet usage analysis, and more particularly, detection of automated Internet activities, the disclosed system and method may be used in any environment where it may be desirable to determine if automated activities occur with a certain time pattern. For example, an activity analyzer, similar to the disclosed Internet usage analyzer 100, may also be utilized to detect and filter out junk emails that are generated and sent by an automated server.

Specifically, such an activity analyzer may include a network interface configured to receive log data that include timing information of a plurality of activities. The activity analyzer may further include a processor coupled to the network interface that is configured to determine a series of interval times for the plurality of events. The processor may also be configured to calculate a series of single standard deviations, where each single standard deviation may be a running standard deviation of a range of interval times. The processor may be further configured to calculate a double standard deviation that is a running standard deviation of the series of single standard deviations. An automated activity may be detected if either the single standard deviation or the double standard deviation is below a threshold for a time period longer than a time threshold.

Internet usage analyzer 100 in the present disclosure may provide increased reliability in detecting automated activities over conventional systems. For example, the disclosed Internet usage analyzer 100 may be capable of detecting automated activities that are also recorded by the proxy logs. Therefore, accuracy of the Internet usage analysis may be enhanced as automated activities are detected and separated from real user usages. Furthermore, by calculating a SDSD of the event interval times, the disclosed Internet usage analyzer 100 may be capable of detecting automated activities that occur at multiple frequencies.

It will be apparent to those skilled in the art that various modifications and variations can be made to the disclosed Internet usage analyzer 100 without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A computer-implemented method for analyzing Internet usage, the method comprising:
receiving proxy log data, wherein the proxy log data include timing information of a plurality of Internet events;
determining a series of interval times associated with the plurality of Internet events;
calculating, using at least one hardware processor, a series of single standard deviations representing a running standard deviation of the series of interval times; calculating a double standard deviation of the series of single standard deviations; and
detecting, using at least one hardware processor, an automated activity if the double standard deviation is below a first pre-determined standard deviation threshold for a time period longer than a time threshold.

2. The method of claim 1, further including detecting an automated activity if a single standard deviation is below a second pre-determined standard deviation threshold for a time period longer than the time threshold.

3. The method of claim 1, wherein determining a series of interval times includes:
sorting the proxy log data in a chronological order; and
determining each interval time as a temporal distance between every two consecutive proxy log data.

4. The method of claim 1, wherein the automated activity is an automated webpage refresh.

5. The method of claim 1, wherein the automated activity is an automated webpage pop-out.

6. The method of claim 1, further including indicating the detected automated activity to a user via a display interface.

7. The method of claim 6, further including:
receiving an input from the user, wherein the input includes a permission to remove the automated activity; and
removing proxy log data that correspond to the automated activity from a proxy log.

8. The method of claim 1, further including determining an active Internet usage time by excluding a duration of the automated activity from a total Internet usage time.

9. An Internet usage analyzer, comprising:
a network interface configured to receive proxy log data from a proxy server, the proxy log data include timing information of a plurality of Internet events; and
a hardware processor coupled to the network interface and configured to:
determine a series of interval times associated with the plurality of Internet events;
calculate a series of single standard deviations representing a running standard deviation of the series of interval times;
calculate a double standard deviation of the series of single standard deviations; and
detect an automated activity if the double standard deviation is below a first pre-determined standard deviation threshold for a time period longer than a time threshold.

10. The Internet usage analyzer of claim 9, wherein the hardware processor is further configured to detect an automated activity if a single standard deviation is below a second pre-determined standard deviation threshold for a time period longer than the time threshold.

11. The Internet usage analyzer of claim 9, wherein the hardware processor being configured to determine a series of interval times includes the hardware processor being configured to:
sort the proxy log data in a chronological order; and
determine each interval time as a temporal distance between every two consecutive proxy log data.

12. The Internet usage analyzer of claim 9, further including a display interface configured to indicate the detected automated activity to a user of the Internet usage analyzer.

13. The Internet usage analyzer of claim 12, further including an input and output interface configured to receive an input from the user, wherein the input includes a permission to remove the automated activity; and the hardware processor is further configured to remove proxy log data that correspond to the automated activity from a proxy log.

14. The Internet usage analyzer of claim 9, wherein the hardware processor is further configured to determine an active Internet usage time by excluding a duration of the automated activity from a total Internet usage time.

15. A non-transitory computer-readable storage medium storing instructions that, when executed by a computer including at least one processor, cause the computer to perform a method for analyzing Internet usage, the method comprising:
receiving proxy log data, wherein the proxy log data include timing information of a plurality of Internet events;
determining a series of interval times associated with the plurality of Internet events;
calculating a series of single standard deviations representing a running standard deviation of the series of interval times; calculating a double standard deviation of the series of single standard deviations; and
detecting an automated activity if the double standard deviation is below a first pre-determined standard deviation threshold for a time period longer than a time threshold.

16. The non-transitory computer-readable storage medium of claim 15, the method further including detecting an automated activity if a single standard deviation is below a second pre-determined standard deviation threshold for a time period longer than the time threshold.

17. The non-transitory computer-readable storage medium of claim 15, wherein determining a series of interval times includes:
sorting the proxy log data in a chronological order; and
determining each interval time as a temporal distance between every two consecutive proxy log data.

18. The non-transitory computer-readable storage medium of claim 15, wherein the automated activity is an automated webpage refresh.

19. The non-transitory computer-readable storage medium of claim 15, wherein the automated activity is an automated webpage pop-out.

20. The non-transitory computer-readable storage medium of claim 15, the method further including indicating the detected automated activity to a user via a display interface.

* * * * *